United States Patent [19]

Greve et al.

[11] 4,343,127
[45] Aug. 10, 1982

[54] FIRE DOOR

[75] Inventors: Dale R. Greve, Beaverton; Charles W. Lehnert, Lake Oswego, both of Oreg.

[73] Assignee: Georgia-Pacific Corporation, Portland, Oreg.

[21] Appl. No.: 225,197

[22] Filed: Jan. 15, 1981

Related U.S. Application Data

[63] Continuation of Ser. No. 10,268, Feb. 7, 1979, abandoned.

[51] Int. Cl.³ .............................................. E04B 2/28
[52] U.S. Cl. ........................................ 52/785; 52/232; 52/811; 428/920; 428/698
[58] Field of Search ................ 106/109, 116; 428/192, 428/538, 920; 52/809, 811, 785, 821, 829, 830, 232

[56] References Cited

U.S. PATENT DOCUMENTS

| | | | |
|---|---|---|---|
| 3,196,494 | 7/1965 | Hartman | 428/50 |
| 3,297,601 | 1/1967 | Maynard | 106/109 |
| 3,305,518 | 2/1967 | Takacki | 106/116 |
| 3,376,147 | 4/1968 | Dean | 52/612 |
| 3,454,456 | 7/1969 | Willey | 106/109 |
| 3,616,173 | 10/1971 | Green | 106/109 |
| 3,775,351 | 11/1973 | Sachs | 106/116 |
| 3,852,083 | 12/1974 | Yang | 106/116 |
| 3,987,600 | 10/1976 | Bachr | 52/232 |
| 4,075,804 | 2/1978 | Zimmerman | 52/232 |
| 4,159,302 | 6/1979 | Greve et al. | 264/333 |

Primary Examiner—Price C. Faw, Jr.
Assistant Examiner—Henry E. Raduazo
Attorney, Agent, or Firm—Synnestvedt & Lechner

[57] ABSTRACT

A fire door comprising a core and edge banding, the principal ingredients of the core being expanded perlite, gypsum and cement, and including, as minor ingredients, an organic binder, and having a density not greater than about 35 lbs./cu. ft. The banding comprises composite stiles and rails, each formed of a strip of wood and a strip of a cast mixture of which the principal ingredient is gypsum and including a binder and preferably also including fibers, unexpanded vermiculite and clay.

12 Claims, 6 Drawing Figures

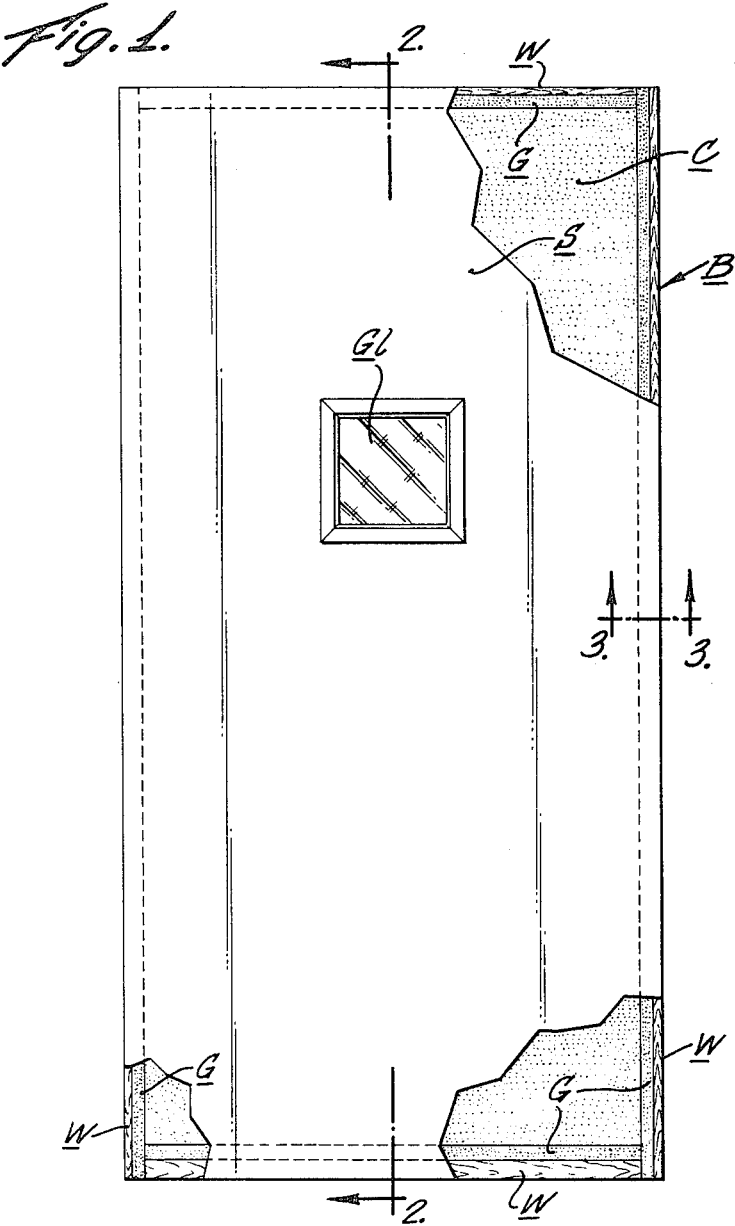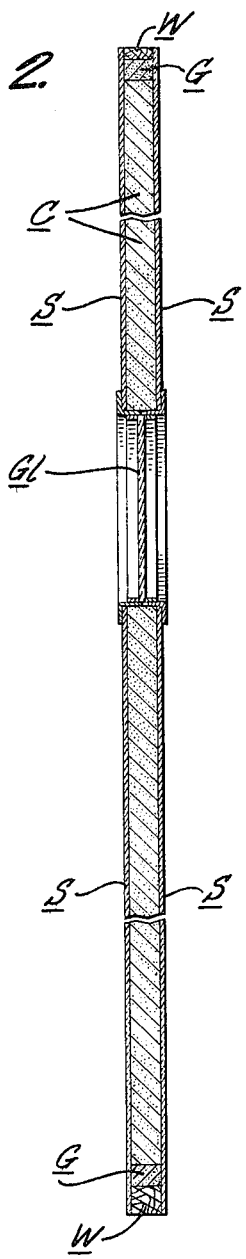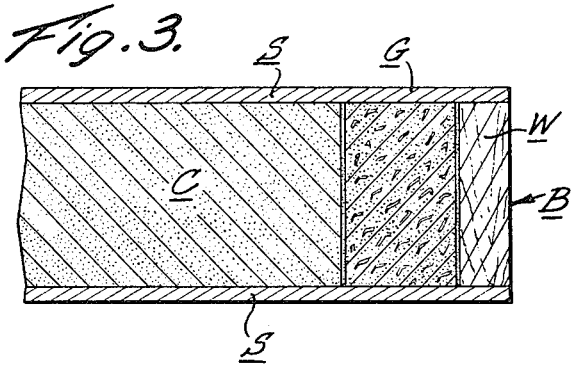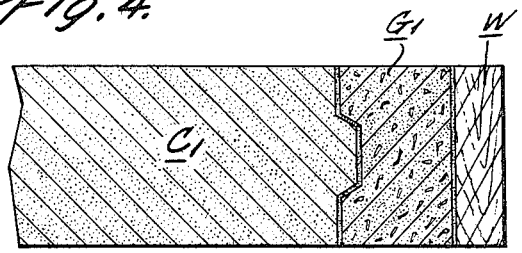

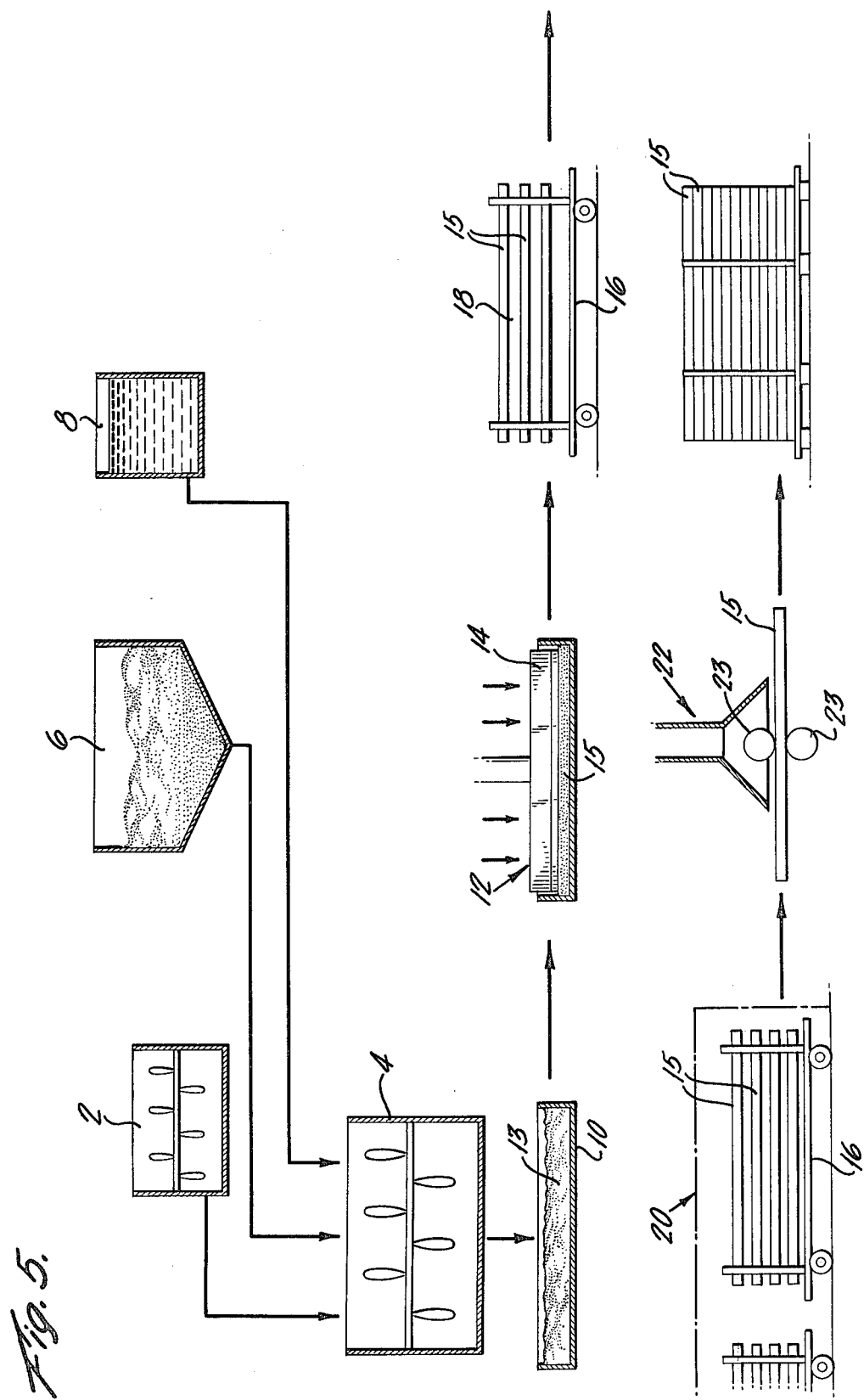

FIRE DOOR

This application is a continuation of application Ser. No. 10,268, filed Feb. 7, 1979, abandoned.

TABLE OF CONTENTS

FIELD OF THE INVENTION
BRIEF DESCRIPTION OF THE DRAWINGS
DETAILED DESCRIPTION
   Door Structure
   Manufacture of Core
   EXAMPLE OF DOOR CORE
      Manufacture of Edge Banding
   EXAMPLE OF EDGE BANDING
      Assembly of Edge Banding with Core

FIELD OF THE INVENTION

This invention relates to fire doors formed of fire-resistant components, each door including a core and edge banding secured to the core and providing for reinforcing the edges of the core and for installing or mounting the door.

The use of fire doors in buildings is an important factor in avoiding injuries and loss of lives and in preventing property damage as a result of their ability to deter the spread of fire. In the interest of public safety, standards have been set by governmental agencies, building code authorities and insurance companies for the installation and performance of door assemblies which retard the passage or spread of fire. Building codes require that fire-resistant door assemblies be installed in wall openings and that such assemblies pass standard and industry-wide accepted tests which are an evaluation of the fire-resistant properties of the door assembly.

The fire door contemplated by the present invention is a composite structure comprising a manufactured fire-resistant core which is surrounded by an edge frame or banding and having veneer or other sheet surface coverings usually comprising either wood or plastic. Such a composite door must have certain basic properties in order to meet accepted standards and pass industry-wide accepted fire endurance tests of door assemblies in accordance with ASTM E-152. In these tests, the door is exposed to intense heat such as that generated by fire in a burning building. Exemplary conditions of such tests involve exposing the door to temperatures which progressively increase to values within the range of 1750° to 1800° F. for an exposure period up to 1½ hours.

It is a general objective of the present invention to provide a fire door meeting the fire code requirements and also providing convenient and economical manufacture, as well as simple and effective fitting and mounting of the doors by use of standard carpentry or other conventional type tools.

It is also an objective of the invention to provide a composite door formed of a molded core and of a special type of composite edge banding made up of a plurality of strips of different materials as fully described hereinafter, and not only having good fire-resistant and strength characteristics so as to reinforce the edges of the core and to meet conditions of use, such as door slamming, but at the same time, having exceptional integrity and machineability.

The invention still further contemplates simplicity in manufacturing techniques, particularly with respect to the edge banding and the application thereof to the edges of the core, while still providing the desired strength and fire-resistant characteristics.

The foregoing and various other objects and advantages will be analyzed in greater detail hereinafter, following some general consideration of the type of construction of fire doors with which the invention is concerned.

BRIEF DESCRIPTION OF THE DRAWINGS

With the foregoing in mind, attention is now directed to the accompanying drawings, in which:

FIG. 1 is an elevational view of a fire door constructed according to the present invention, with certain corner portions broken out in order to show interior parts;

FIG. 2 is a vertical sectional view taken on the line 2—2 of FIG. 1;

FIG. 3 is a horizontal fragmentary sectional view on an enlarged scale, taken as indicated by the section line 3—3 of FIG. 1;

FIG. 4 is a view similar to FIG. 3 but illustrating an alternative embodiment;

FIG. 5 is a flow diagram of a process for manufacturing a fire door core of the kind contemplated for use in the fire door of the present invention.

DETAILED DESCRIPTION

Figure 6:
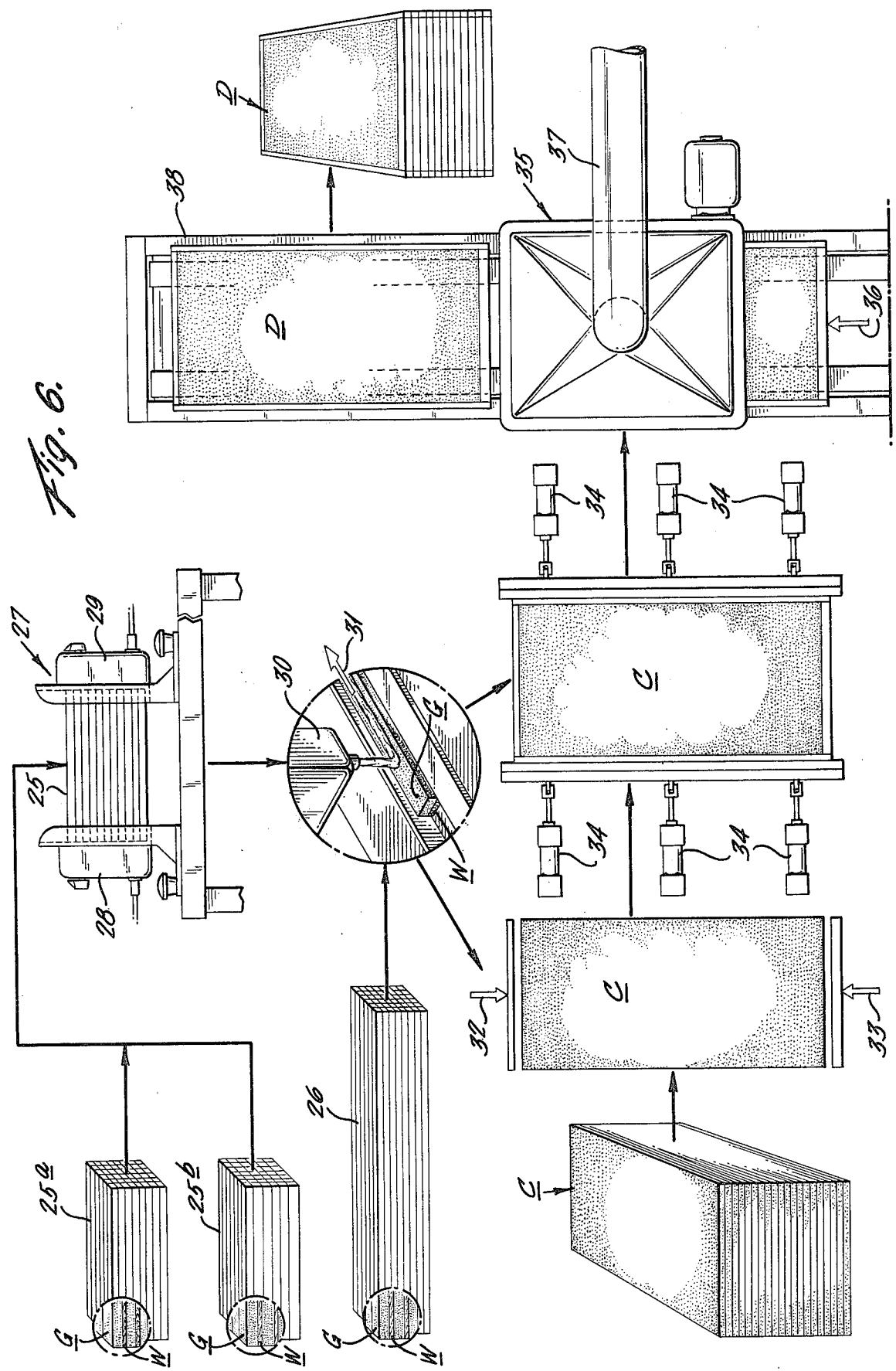
FIG. 6 is another flow diagram of a process for assembling edge banding stiles and rails with fire door cores, in accordance with the practice of the present invention.

In the detailed description given hereinafter, reference is first made to the structure of the door as illustrated in FIGS. 1 to 4. Thereafter, description is given concerning the composition and manufacture of the core, with particular reference to FIG. 5; and then description is given concerning the preparation and composition of the edge banding; and finally description is given concerning the assembly of the edge banding with cores, with particular reference to FIG. 6.

Door Structure

A typical fire door constructed according to the present invention is illustrated in FIGS. 1 to 3. The door is made up of a core C formed in the manner described hereinafter and edge banding indicated generally by the letter B is applied to the edges of the core, the edge banding being of composite construction as will be described more fully hereinafter. If desired, the door may be provided with a glass panel or light as indicated at G1. Preferably, both sides of the door are covered with sheet material as indicated at S, in the form of wood veneer or a plastic layer.

For reasons fully brought out hereinafter, each piece of the composite edge banding B is desirably formed of two adhesively bonded strips, one strip comprising a wood strip indicated at W and the other comprising a gypsum based composition indicated at G. In the embodiment of the door shown in FIG. 3, the gypsum strip G has a flat surface positioned adjacent to the edge of the core, with the wood strip W positioned at the outer side of the gypsum strip G. In the modified arrangement shown in FIG. 4, the abutting edges of the core $C^1$ and of the gypsum strip $G^1$ have tongue and groove interengaging surfaces as shown.

Manufacture of Core

Although the invention is particularly concerned with the combination of a certain type of edge banding with a variety of types of fire door cores, one example of a core useable in the manufacture of the fire doors contemplated according to this invention is disclosed in the pending U.S.A. application of Dale R. Greve and Turner W. Richards, Ser. No. 868,037, filed Jan. 9, 1978, and assigned to the Assignee of the present application. Some description of the fire door of said copending application and of the method for manufacture thereof is, therefore, presented herebelow, but it is to be understood that the combination of core and banding contemplated by the present invention may be employed when using a variety of specific embodiments of the cores. Preferably, however, the cores employed in the combination of the present invention are cores which contain at least some calcined gypsum, in addition to at least 50% of expanded perlite.

The ingredients employed in the preparation of the cores in accordance with the copending application referred to above, and more fully identified hereinafter, but it is first noted that in the set core of the companion application, the ingredient which is present in an amount greater than any other of the ingredients comprises expanded perlite, which is a glass-like material. Speaking generally, expanded perlite can be formed by heating moisture-containing, naturally-occurring perlite ore at a temperature within the range of about 1,500° to 2,000° F. Such heat treatment explodes or expands the perlite to, for example, 15–20 times its original volume. Commercially available grades of expanded perlite known as cryogenic, plaster and concrete aggregate are exemplary of materials that can be used.

The particle size of the expanded perlite can vary over a wide range. Expanded perlite having a particle size distribution as set forth below is exemplary.

| Mesh (U.S. Standard Sieve Series) | Percent Retained |
|---|---|
| 30 | 24 |
| 50 | 73 |
| 100 | 93.5 |

It should be understood that expanded perlite of different particle size distribution can be used in the practice of the present invention.

The expanded perlite functions as a non-combustible, compactible filler which imparts light weight to the set composition, and also relatively high strength as compared to other means which could be used to impart light weight to the set composition, for example, such as by introducing air voids into the set composition by foaming the mixture of ingredients from which the set composition is made.

To optimize strength properties of the core, those forms of expanded perlite which are more resistant to being compressed or compacted than other forms are used. It has been observed that various forms of perlite are less spongy than others. The less spongy the perlite, the greater its resistance to being compressed and the greater the strength of the core. Conversely, the more spongy the perlite, the more readily it is compressed and the lower the strength of the core.

In the companion application above identified, detailed description is given of a method by which the compressibility or compactibility property of expanded perlite can be evaluated. If further information relating to this subject is needed, reference may be made to said copending application.

Cores having particularly good strength properties can be prepared from expanded perlite which has a compressibility of at least about 90 lbs./sq. inch.

The set core compositions comprises also set gypsum, that is, calcium sulphate dihydrate. The set gypsum is formed by the recrystallization of calcined gypsum with water. Calcined gypsum is in general produced by driving off water of hydration present in naturally-occurring gypsum (calcium sulphate dihydrate) through the use of heat. Depending on the degree of calcination, there is produced calcium sulphate hemihydrate ($CaSO_4 \cdot \frac{1}{2} H_2O$) or other form of calcium sulphate which is capable of hydrating with water to form set gypsum. The calcined gypsum is conveniently used in powdered form.

Another ingredient preferably used in the core is hydraulic cement, a material which reacts with water to form a hydrated product. Various types of hydraulic cements can be used including those occurring in nature. Examples of hydraulic cements include Portland cement, cements containing a high content of aluminates and characterized by their rapid hardening properties, pozzolanic cement, cements characterized by their high content of calcium silicates, and cement from deposits in the Lehigh Valley, Pa. Mixtures of different cements can be used also. Portland cement is readily available and excellent results have been achieved using this relatively inexpensive cement. It is preferred that the core be prepared from Type III Portland cement.

The set hydraulic cement imparts to the core good water-resistant properties and enhances compressive strength. Accordingly, the set hydraulic cement aids greatly in maintaining the integrity of the core when it is exposed to the wetting and the pressure of a fire hose stream. In addition, the set hydraulic cement functions as shrink-resistant material in the core when it is exposed to fire.

The use of an organic binder in the set core of the present invention is necessary to achieve desired flexural and compressive strength and general handling characteristics. Desired strength characteristics can be achieved without the use of the organic binder and by using relatively high amounts of gypsum and/or cement. However, this increases the density of the product. The organic binder can be a naturally-occurring material or a synthetic material. Examples of the former include starches, dextrins and gums. Examples of synthetic materials are resins such as polyvinyl alcohol, polyvinyl acetate, polymers of vinyl acetate and ethylene, styrene/butadiene polymers and acrylic resins.

The organic binder is typically a material which is dispersible or soluble in water. The preferred organic binder is polyvinyl alcohol, a well known commercially available material.

In preferred form, the fire door core is prepared from several additional ingredients, namely, unexpanded vermiculite, clay and fibrous reinforcements.

The vermiculite component that is used in preparing the fire door core is comminuted unexpanded vermiculite. This ingredient contributes fire-resistant properties to the set composition and counteracts its tendency to shrink at elevated temperatures thereby imparting improved dimensional stability properties to the set composition during exposure to heat. As is known, unexpanded vermiculite expands upon being heated. Such expansion tends to compensate for the tendency of the core to shrink at elevated temperatures as a result of sintering of materials comprising the core. For example, set gypsum tends to shrink as its chemically combined water is driven off by heat.

The use of clay imparts to the set core improved fire-resistant and high temperature, dimensional stability properties. Broadly speaking, clays are natural, earthy, fine-grained materials, most of which exhibit plastic characteristics when moistened with limited amounts of water. In general, clays comprise primarily alumina, silica and water and may also contain to a lesser extent iron, alkali, alkaline earth and other metals. The various types of clays in general have particles ranging in size from fractions of a micron to about 40 microns, although some materials having particles of an even larger size are also considered clays. It should be understood that materials which do not have all of the above characteristics, but which nevertheless are generally referred to as clays because they have one or more of the above characteristics are included within the term "clay" as used herein.

Examples of the types of clay that can be utilized are: bentonite—comprised mainly of the clay mineral montmorillonite; attapulgite—clays which contain magnesium aluminum silicates; and kaolinitic clays—including, for example, kaolin (also referred to as china or paper clays), ball clay, fireclay, and flint clay, which clays are comprised predominately of the clay mineral kaolinite. Other of the various types of clays which contain mixtures of various proportions of clay minerals, such as for example, illite, chlorite, kaolinite and montmorillonite, as well as non-clay materials, may also be used.

Preferred clays for use in the practice of the present invention include kaolinite, attapulgite and bentonite.

Fibrous reinforcements impart flexibility and impact-resistant properties to the set composition, and also better handling properties in that resistance to cracking or breakage during shipment or processing is improved. Glass fibers are preferred. Examples of other fibrous reinforcements that can be substituted for glass fibers or used in combination therewith are sisal fibers, asbestos, graphite and synthetic fibers, such as, for example, rayon and polyacrylonitrile.

As to amounts of ingredients utilized in the practice of the present invention, the set composition comprises the set product of an aqueous mixture, based on the total weight of the dry ingredients in the mixture, of:
  (A) about 50 to about 70 wt. % of expanded perlite;
  (B) about 10 to about 30 wt. % of calcined gypsum;
  (C) about 10 to about 20 wt. % of hydraulic cement;
  (D) about 1 to about 5 wt. % of an organic binder;
  (E) 0 to about 4 wt. % of unexpanded vermiculite;
  (F) 0 to about 4 wt. % of clay, and
  (G) 0 to about 1 wt. % of fibrous reinforcements.
In preferred form, the aforementioned aqueous mixture includes:
  (A) about 50 to about 55 wt. % of said perlite;
  (B) about 20 to about 25 wt. % of said gypsum;
  (C) about 10 to about 15 wt. % of said cement;
  (D) at least about 1.5 wt. % of said organic binder;
  (E) at least about 1.5 wt. % of said vermiculite;
  (F) at least about 1.5 wt. % of said clay; and
  (G) at least about 0.2 wt. % of said fibrous reinforcements.

The mixture from which the set core is made contains also water in an amount at least sufficient to provide the stoichiometric amount of water needed to cause the setting of the calcined gypsum and hydraulic cement. It is generally expedient to include an amount of water in excess of the stoichiometric amount. For ease of manufacture, it is preferred that the amount of water be no greater than that needed to provide a damp mixture of the ingredients. However, the set core can be produced more readily from a damp mixture of the ingredients than from a slurry thereof. The set core can be prepared readily from about 25 to about 60% of water based on the weight of the dry ingredients comprising the mixture.

Set cores within the scope of the present invention can be prepared having a compressive strength of at least about 200 lbs./sq. inch and ranging up to about 400 lbs./sq. in. Furthermore, set cores which are relatively light in weight can be produced. For example, set cores having a density within the range of about 22 to about 35 lbs./cu. ft. and having required fire-resistant properties can be manufactured. It should be understood that set compositions of greater density can be produced also from the ingredients described above.

It is preferred that the core ingredients be mixed in a manner such that breakdown or fracturing of the expanded perlite is minimized. Breakdown of the expanded perlite prior to its being compressed adversely affects the strength of the core. It is noted that the expanded perlite constitutes most of the volume of the mixture of ingredients.

Accordingly, the effectiveness of the mixing step with respect to minimizing breakdown of the unexpanded perlite can be determined by comparing the volume of the mixture at the start of mixing with the mixture's volume after mixing is terminated. Preferred and effective mixing is accomplished when the volume of the mixture at the start of mixing is substantially the same as when mixing is terminated.

In preferred form, the set composition or core is prepared as follows. The hydraulic cement and calcined gypsum are initially premixed and then combined with the expanded perlite and water as all of the ingredients are brought together and mixed. Mixing the perlite with the other solid ingredients after the latter have first been premixed allows the perlite to be thoroughly blended into the mixture with a minimum of mixing. This is advantageous because it minimizes fracturing or breakdown of the perlite.

When utilizing an organic binder, it may be incorporated in the water which is added to the other ingredients in an amount at least sufficient to provide the water necessary to set the calcined gypsum and cement, and preferably in an amount no greater than that necessary to provide a damp mixture of the ingredients. Other ingredients such as unexpanded vermiculite, clay and fibrous reinforcements are mixed preferably with the hydraulic cement and calcined gypsum prior to the addition of the expanded perlite and water. Thorough mixing of the ingredients has been accomplished in a paddle type mixer by mixing for about 25 to about 40 seconds.

After the ingredients are mixed thoroughly, the damp mixture is transferred to an open-top mold having a shape corresponding to that desired for the door core being made. The damp mixture is then compression molded to compact the mixture to the desired density and thickness or a thickness somewhat greater than desired in the finished core. Excellent results have been obtained by compressing the damp mixture to about 25 to about 33% its original volume utilizing pressures within the range of about 90 to about 120 psi for about 15 to about 25 seconds. As the mixture is compressed, the expanded perlite is compressed to a significant degree.

One of the important characteristics of the present development is that immediately after the damp mixture has been compressed, its green strength is such that it is shaped-retaining and it can be conveyed or transferred to the drier without breaking. Exemplary compression strengths of the freshly compressed core are within the range of about 50 to about 100 psi. It is believed that the green strength of the core is due to partial setting of the calcined gypsum and compression of the mixture. Although drying of the core can be accomplished at room temperature, it is preferred to accelerate drying by the use of heat. This can be accomplished by placing the core in an oven having a temperature within the range of about 150° to about 300° F. for a period of time within the range of about 4 to about 8 hours. It should be understood that the time during which the core remains in the heated environment will depend on the temperature thereof.

Following the above method, it is possible to prepare a finished core within a relatively short period of time, for example, within about 4 to about 8 hours from the time the ingredients are combined for mixing.

After the core has been dried, finishing operations can be effected. For example, the core can be sanded to a thickness within the required tolerance, sawed or shaped as desired. The nature of the dried material is such that finishing operations can be performed readily.

A specific example of a method for preparing a fire door core useable in the door of the present invention is described below in connection with FIG. 5.

Gypsum, Portland or other hydraulic cement, vermiculite, clay and chopped glass fibers or other fibrous reinforcements are mixed thoroughly in the mixer indicated at 2 and this premixture is then fed to the mixer 4 into which there is also fed expanded perlite from container 6 and an aqueous dispersion or solution of polyvinyl alcohol or other organic binder from container 8. All of the ingredients are mixed thoroughly in mixer 4. The water required to set the calcined gypsum and hydraulic cement is available from the aqueous dispersion or solution of the organic binder and is added in an amount such that a damp mixture of ingredients is obtained. After thoroughly mixing the ingredients in mixer 4, the damp mixture 13 is fed to mold 10. The mold 10 is then transferred to a pressing station 12 where the mixture 13 is compressed by press member 14 into the desired shape and density and to a thickness greater than, but approximating that desired.

Promptly after the mixture has been compressed, the formed core 15 is removed from the mold and transferred to cart 16 where it is supported on rollers 18. As mentioned above, one of the important characteristics of the freshly compressed core is that it has a sufficiently high green strength to permit it to be handled in the manner described without damage.

After loading the cart 16 with formed cores, the cores are held for a short time at ambient temperature to allow for hydration of the calcined gypsum and hydraulic cement. They are then transferred to the drier 20. The cores should be allowed to dry to the extent that their free moisture content is about 0.1 to about 1.5 wt. %.

After the cores have dried to the desired extent, they are transferred to sanding station 22. Sanding rollers 23 smooth the top and bottom surfaces of the core 15 and impart a substantially uniform thickness to the core and a thickness which is within the desired tolerance. It is often necessary to sand only one surface of the core.

After the sanding operation is completed, the cores can be stacked for shipment, as shown in FIG. 5, or can be transferred to the facility for applying the edge banding, as described hereinafter with reference to FIG. 6.

Although door cores may be made up of a single piece, as is indicated by the numeral 15 in FIG. 5 and also as indicated by the letter C in FIGS. 1 to 4 and 6, it is to be understood that if desired, the core may be made up or assembled from several pieces which may either have flat abutting edge surfaces or be provided with tongue and groove interengaging surfaces so that they may be assembled in interlocking relationship. It multiple pieces are employed for assembling the core, the use of veneer or other sheet material adhesively applied at the faces of the door may serve to unify the structure.

EXAMPLE OF DOOR CORE

The following is illustrative of the preparation of a core for use in the door of the present invention.

A core was prepared from a mixture of the following ingredients:

| Ingredients | Amount, weight percent |
| --- | --- |
| expanded perlite | 55.2 |
| calcined gypsum ($CaSO_4 \cdot \frac{1}{2}H_2O$) | 24.8 |
| Portland cement (Type III) | 12.4 |
| polyvinyl alcohol | 3.2 |
| unexpanded vermiculite | 2.1 |
| clay | 2.1 |
| glass fibers | 0.2 |

The expanded perlite was of the type generally referred to as cryogenic grade and had a compressibility of 93 lbs./sq. in., a density of 6.5 lbs./cu. ft. and a particle size as follows:

| Mesh (U.S. Standard Sieve Series) | Percent Retained |
| --- | --- |
| 30 | 24 |
| 50 | 73 |
| 100 | 93.5 |

The polyvinyl alcohol was substantially fully hydrolyzed polyvinyl acetate sold under the trademark Elvanol 90-50 G and comprised polyvinyl alcohol having a bulk density of about 26 lbs./cu. ft. and a specific gravity of about 1.3. The vermiculite was high grade comminuted vermiculite (Grade BO-4). The clay utilized was finely ground kaolin having an average particle size of less than 2.5 microns. The glass fibers were chopped glass fibers having a length of about ½ in.

The fire door core was prepared in substantially the same manner as described in connection with the description of the process shown in FIG. 5. Thus, the gypsum, Portland cement, vermiculite, clay and glass fibers were mixed initially and then fed to another mixer into which there also was fed perlite and a solution of polyvinyl alcohol. The polyvinyl alcohol solution was prepared by adding about 6 wt. % of powdered polyvinyl alcohol to water at about room temperature and then dissolving the polyvinyl alcohol therein by adding live steam to the mixture of polyvinyl alcohol and water. The water of the polyvinyl alcohol solution was also the source of the water for effecting the setting of the calcined gypsum and the Portland cement. The water comprised about 58% of the weight of the mixture of dry ingredients.

Mixing of all of the ingredients produced a damp granular mixture which was delivered into a 3'×7' mold and leveled. The mixture was then compressed to about one-third of its volume and to a thickness of about 1 -9/16" with the ram of a press under a pressure of about 100 psi which was applied for about 20 seconds.

Immediately after compressing the mixture into the core, it was removed from the mold and placed in an oven having a temperature of about 250° F. to set and dry. The core was removed from the oven after about 8 hours. The dried core was then sanded to a uniform thickness of 1½". The set core had a compressive strength of about 300 psi and a dry density of about 26 lbs./cu. ft.

The foregoing technique provides for the production of cores of relatively low density and having the required properties with respect to meeting building code requirements for fire endurance, including hose stream test, and also having strength to provide satisfactory performance.

Manufacture of Edge Banding

Although certain fire door edge banding has heretofore been employed in the form of wood strips chemically treated to improve fire resistance, the present invention contemplates employment of a composite edge banding in order to further increase the fire resistance of the banding itself and thus of the combination of the banding with the fire door core, while at the same time providing certain other advantages, as will be explained.

It is contemplated according to the present invention that the banding be made of two strips of material, one of which comprises a wood strip, for instance hemlock wood impregnated or treated with an appropriate fire-retardant chemical, and the other of which comprises a strip formed primarily of gypsum dihydrate, preferably in combination with lesser amounts of certain other ingredients as will be explained. The two strips of each piece of edge banding are preferably adhesively bonded to each other, and the composite strip is secured to the core with the gypsum strip lying adjacent to the edge of the core and with the wood strip at the outer side of the gypsum strip, for reasons which will be explained. The wood and composition strips of the banding are preferably adhesively bonded together, as by a hot melt adhesive.

This edge banding system substantially improves the fire-resistant properties of the edge banding, as compared with an all-wood edge banding, because the gypsum composition strip has much higher fire resistance than the wood even when the wood is treated with fire-retardant chemicals. The invention contemplates the employment of the composite of multiple strip edge banding (one strip of wood and one strip of gypsum composition) in order to retain certain of the desirable characteristics of the wood, namely the ready workability with carpentry or other conventional tools, in the outer edge portion of the banding elements. The wood strip is much more readily trimmed and fitted than is the case with the gypsum strip.

By employing the composite banding and applying the banding with the gypsum strip adjacent to the core and the wood strip at the outer or exposed edge, the presence of the remaining thin strip of wood does not appreciably impair fire resistance. An important reason for this is that in the application or mounting of a fire door in a doorway, the edge of the door at one side face normally abuts a shoulder surrounding the doorway on at least the vertical edges and the top edge; and this overlap of the doorway shoulder and the wood strip of the edge banding allows the door to conceal the opening even if the wood burns away, thereby preventing the passage of flames.

The gypsum strip for the edge banding according to the present invention desirably includes ingredients as listed below:

| | |
|---|---|
| gypsum dihydrate | 60.-80. |
| clay | 0-10. |
| raw vermiculite | 0-7. |
| glass fiber | 0.25-5. |
| wood chips | 0-15. |
| kraft paper fiber | 0-3. |
| resin emulsion (solids) | 5.-16. |
| dispersant | 0-1. |
| accelerator | 0-1. |

Preferably, the several ingredients are used in the ranges indicated just below:

| | |
|---|---|
| gypsum dihydrate | 67.3-78.0 |
| clay | 3.0-5.5 |
| raw vermiculite | 4.5-5.5 |
| glass fiber | 0.7-1.5 |
| wood chips | 5.0-7.0 |
| kraft paper fiber | 0.8-1.2 |
| resin emulsion (solids) | 8.0-12.0 |
| dispersant | trace |
| accelerator | trace |

EXAMPLE OF EDGE BANDING

As a specific example, the following formulation has been used:

| | |
|---|---|
| gypsum dihydrate | 70.05 |
| clay | 4.91 |
| raw vermiculite | 4.91 |
| glass fiber | 0.84 |
| wood chips | 6.25 |
| kraft paper fiber | 0.94 |
| resin emulsion (solids) | 10.42 |
| dispersant | 0.84 |
| accelerator | 0.84 |

Although various resins may be employed, a particularly effective resin emulsion is one manufactured by Union Carbide and identified as UC 130, being a polyvinyl acetate homopolymer. The resin just mentioned is a thermoplastic resin and it is preferred to employ a thermoplastic resin, rather than a thermosetting resin. The heat required to set a thermosetting resin tends to calcine the gypsum in the composition strip being formed. Another thermoplastic resin which has been found useable is known to the trade as Rhoplex AC-388, being an acrylic resin manufactured by Rohm and Haas.

In selecting the resin, it is preferred to employ thermoplastic resins, which when applied to a surface, tend to form a tough film, rather than a brittle film or one which is soft and has very low tensile strength, as is readily determined by peeling the formed dry film from a smooth surface on which the resin was applied.

Preferably, the gypsum composition strip is formed by a casting technique, i.e., a technique in which an aqueous slurry of the ingredients is delivered onto a moving belt, for example of the kind employed in the manufacture of gypsum wallboard, and the slurry is dried by application of heat, the quantity of the ingredients above referred to being given for the set and dry composition. The water may be introduced into the mixture by way of the aqueous emulsion of the resin.

Paper covering sheets may be incorporated in the casting operation, as is customarily done in the gypsum wallboard technique. After the casting operation, the strips may be cut to the desired size from the casting. It is pointed out that the reference herein to the "casting" of the gypsum composition strip is not to be understood as limited to specific techniques either with or without pressure, but preferably the composition is formed from a slurry in a manner providing a set and dry composition of substantial density. In the specific example and preferred range given above, the density will be of the order of 55 to 60 lbs./cu. ft. The density of the composition strip should be at least 50 lbs. and may vary from about 50 to about 75 lbs./cu. ft. depending upon the quantities of the ingredients employed.

It will be observed that in common with the composition for the core, the composition for the edge banding contains gypsum and in addition also contains clay and raw vermiculite, both of which latter are also preferably included in the core formulation. In the edge banding composition, as in the core composition, the vermiculite and clay are modifying ingredients which reduce the shrinkage of the gypsum which occurs for instance in a fire test. Moreover, the edge banding composition without clay or vermiculite would still have some fire resistance, but not as much as when these ingredients are present.

One of the important characteristics of the edge banding composition is the screw-holding power, this being of particular importance since hinge butts for the door hinges are customarily screwed into the edges of the banding. The presence of fibers in the edge banding composition is important in contributing screw-holding power, as is also the employment of a substantial quantity of the resin. The wood and paper fibers also help to reduce the density and make the composition more machineable. Still further, the presence of fibers contributes to the bondability of the gypsum strip with reference to adhesives enployed for securing the banding directly to the edges of the core, or employed in securing the veneer or other sheets at the faces of the door, such covering sheets ordinarily covering the core itself and also overlapping the banding.

The resin emulsion is also of great importance in providing adequate screw-holding capacity, particularly in combination with the fibers present. The resin also contributes strength and machineability of the composition strip of the edge banding.

The presence of some glass fibers is of importance in maintaining the integrity of the composition strip during fire and hose stream testing.

Assembly of Edge Banding with Core

As above indicated, the composite edge banding is preferably positioned at the edge of the core with the gypsum composition strip of the banding presented inwardly; and it is pointed out that several alternative techniques may be adopted in the fabrication of the doors, i.e., the assembling of the edge banding with the cores. One of these techniques is diagrammatically represented in FIG. 6; and according to this technique, the stiles and rails of the edge banding are directly applied to and adhesively bonded to the edge surfaces of the core. Although alternative techniques are pointed out hereinafter, attention is now directed to FIG. 6 which illustrates the assembly and bonding of the edge banding strips directly to the edges of a core.

A stack or supply of cores is indicated at C in the lower left corner of FIG. 6. In this embodiment of the assembly technique, a pair of top and bottom rails derived from the supply sources 25a and 25b, is brought into position at the ends of the core, as indicated by the arrows 32 and 33 in FIG. 6 but prior to this assembly, a group of the rails is initially placed in the jig shown in outline at 27 and heating elements, indicated diagrammatically at 28 and 29, are brought against the ends of the rails 25a and 25b in order to warm the end portions of the rails and thereby prevent the hot melt adhesive from cooling prematurely. From the jig 27 each rail is brought to a position below the adhesive supply device 30 from which a stream of the adhesive material is applied to the strip as the strip is moved in the direction indicated by the arrow 31. The adhesive may be any of many well-known hot melt adhesives, for instance, H. B. Fuller No. HM1428. As seen in FIG. 6, the banding piece to which the adhesive is being applied is positioned so that the adhesive is applied to the surface of the composite strip G which, as above indicated, is to be placed against the edge of the core C, as indicated at 32 or 33.

The stiles for the upright edges of the door may be derived from the source of supply indicated at 26, from which they are handled in the same manner as described above for the top and bottom rails, in order to apply adhesive from the adhesive supply device 30. The stiles are then brought against the edges of the core being assembled; and as shown in FIG. 1 and also in FIG. 6, the stiles extend at their ends into positions overlapping the ends of the rails. These operations involving the sequential application of the rails and then of the stiles proceed quickly, so that the prewarmed ends of the rails will still readily absorb adhesive when the stiles are pressed against the side edges of the core as by the pressure actuating devices 34, 34.

The application of the rails and stiles is preferably effected on a flat supporting table to facilitate registration of the banding elements with the core. The assembled core is then introduced into a sanding or finishing machine as indicated at 35, through the doors and fed in the direction indicated by the arrow 36; and in this stage of the operation, the dust from the sanding is withdrawn through the duct indicated at 37, the banded assembly being delivered onto a table 38 as indicated, from which the individual banded cores may be stacked, as indicated at D. This stacking may be accomplished on a pallet, if desired, for shipment or for transport to other equipment for application of facing sheets, such as the sheets indicated at S in FIGS. 1, 2 and 3.

When facing sheets are to be applied, the banding elements need not necessarily be directly adhesively bonded to the edges of the core; and in this alternative procedure, the core, rails and stiles may all be assembled in a jig and a facing sheet applied over the assembly. In this case, it is contemplated that adhesive be applied to the assembled core and banding elements, and facing sheets, and upon application of the facing sheets and setting of the adhesive, the facing sheet serves as a means for retaining the banding elements in assembled relation with the core. It will be understood that in a typical operation where facing sheets are employed, they will be applied to both sides of the core and banding elements.

With regard to the wood strips W of the banding elements, it is mentioned that, if desired, such wood strips may be made up by lamination of a multiplicity of layers, in the manner of plywood, although unlaminated strips of maple or hemlock, or even of various other woods may be used, and it is preferred that the wood be treated with a fire-retardant chemical, as already indicated.

The strips of the banding elements may be applied sequentially, i.e., a gypsum composition strip may first be applied and thereafter, a wood strip may be adhesively bonded to the gypsum strip; but it is preferred to preassemble and prebond the gypsum and wood strips, because this minimizes registration and clearance problems in assembly. Although it is preferred to employ the composite gypsum and wood banding elements as above described for the top and bottom rails, banding elements formed entirely of gypsum compositions may be used. It is particularly desirable to have the composite banding elements in the position of the stiles because these represent the edges of the door to which the hinges are applied and to which door latches and attachment of other hardware may be required. As above noted, the presence of the wood facilitates machining and various operations performed by carpentry tools.

For the purpose of maximizing fire resistance, it is preferred to employ a wood strip in the banding somewhat thinner than the gypsum strip thereof. Typical dimensions in this connection appear just below in the dimensional description of a door:

| Door: | | |
|---|---|---|
| Width: | 47 ⅞" | |
| Height: | 95 ⅞" | |
| Thickness: | 1 ¾" | |
| Skins: | ⅛"untreated Birch veneer plywood | |
| Adhesive: | Bordens WB 904, Catalyst M-168-L Cold pressed | |
| Edge Banding: | 1"Gypsum Composition laminated to ⅝"chemically impregnated Hemlock bonded with Bordens WB Adhesives | |
| | Stock Size | Trimmed Size |
| Stiles: | 1 9/16" × ⅝" | 1 ½" × ⅝" |
| Top Rail: | 1 9/16" × ⅝" | 1 ½" × ¼" |
| Bottom Rail: | 1 9/16" × 1 ¼" | 1 ½ × 1 ¼" |
| Glass Light: | 10 ¾" × 10 ¾" × ¼"thick wired glass | |

From the above, it will be seen that the thickness of the wood strip in the stiles is less than the thickness of the gypsum strip of the stiles. After cutting to accommodate hinge butts, the remaining wood strip is even thinner; and in view of these dimensional relationships, it is of importance that the underlying gypsum strip have substantial screw-holding capacity. The density of the gypsum composition strip, the presence of fibers and the presence of a substantial quantity of the thermoplastic resin are all factors of significance in establishing screw-holding capacity adequate to meet the demands of securing hinges and latch plates capable of withstanding normal use. Gypsum composition strips formulated in the manner above referred to, especially within the preferred ranges of the ingredients as given above will have a screw-holding capacity of at least 400 lbs., and it is preferred that the screw-holding capacity be at least about 500 lbs. This value may be determined by a simple screw-holding test accomplished by drilling a 5/32" pilot hole in a piece of the gypsum strip 1"×1½". A number 12 sheet metal screw is then inserted in the pilot hole and the screw is pulled to failure, and the screw-holding capacity measured as the value of the pull in pounds at the point of failure.

It should be noted that the door assembly provided in accordance with the practice of the present invention meets the conditions of acceptance of fire tests, such as those referred to hereinabove. In addition, the employment of the composite banding, comprising a strip of gypsum based material and a strip of wood in combination with the core formed of materials as described, including gypsum, also has improved fire resistance because of the employment of the composite banding, while at the same time affording special advantages in connection with the carpentry working required in the mounting of the doors.

We claim:

1. A fire door comprising a core and edge banding, the core comprising a molded mixture formed from particulate materials including at least 50 weight percent of expanded perlite, at least 10 weight percent of calcined gypsum and an aqueous binder, the molded core having a density of not greater than about 35 lbs./cu. ft., and the banding comprising composite banding elements each formed of a strip of wood and a strip of a cast mixture formed from an aqueous slurry of particulate materials including at least 60 weight percent of calcined gypsum, fibers, an accelerator and an aqueous binder, the cast strip having a density of at least 50 lbs./cu. ft., the wood and cast strips of each element being adhesively bonded to each other, and the banding elements being positioned at edges of the core and being secured to the core with the cast gypsum strip of each element presented inwardly toward the edge of the core.

2. A fire door according to claim 1 in which the gypsum strip of the banding is adhesively bonded to the edge of the core.

3. A fire door according to claim 1 further including a facing sheet at at least one side of the door, the facing sheet being adhesively bonded to the core and to the edge banding.

4. A fire door according to claim 1 in which the wood strips of the banding are treated with a fire-retardant impregnant.

5. A fire door according to claim 1 in which the strips of the banding formed of cast gypsum are of greater thickness than the wood strips.

6. A fire door comprising a core, edge banding and a covering on at least one face of the door, the core comprising a molded mixture formed from particulate materials including at least 50 weight percent of expanded perlite, at least 10 weight percent of calcined gypsum and an aqueous binder, the molded core having a density of not greater than about 35 lbs./cu. ft., the banding comprising composite banding elements each formed of a strip of wood and a strip of a cast mixture formed from a slurry of particulate materials including from about 60 to about 80 weight percent of calcined gypsum, from about 5 to about 15 weight percent of reinforcing fibers, an accelerator and an aqueous binder, the cast strip having a density of at least 50 lbs./cu. ft., the wood and cast strips of each element being adhesively bonded to each other, and the banding elements being positioned at the edges of the core with the cast gypsum strip of each element presented inwardly toward the edge of the core, and the covering comprising sheet material overlying a face of the core and also overlying the edge banding and adhesively bonded both to the core and at least to the edge of the wood strip of the banding elements.

7. Fire door edge banding comprising a strip of wood and a strip of a cast mixture of from about 60 to about 80 weight percent of set gypsum, from about 5 to about 15 weight percent of reinforcing fibers, and an inorganic binder, the cast strip having a density of at least 50 lbs./cu. ft., the wood and cast strips having end surfaces at each end lying in a common plane and having abutting surfaces adhesively bonded to each other.

8. A method for making an edge-banded fire door comprising molding a door core from a mixture of particulate materials including at least 50 weight percent of expanded perlite, at least 10 weight percent of calcined gypsum and an aqueous binder, compressing said mixture to form a molded door core; preassembling edge banding from strips of wood and composition material, the composition strips being cast from particulate materials including at least 60 weight percent of calcined gypsum, fibers, an accelerator and an aqueous binder and bonding the wood and composition strips to each other; and after the strips are bonded to each other applying the edge banding to the edges of the core with the composition strip presented inwardly toward the edge of the core.

9. A fire door comprising a core and edge banding, the core comprising a molded fire-resistant composition having a density of not more than about 35 lbs./cu. ft., and the banding comprising composite banding elements each formed of a strip of wood and a strip of a cast mixture of the following ingredients in the weight percentages indicated:

| gypsum dihydrate | 67.3–78.0 |
| clay | 3.0–5.5 |
| raw vermiculite | 4.5–5.5 |
| glass fiber | 0.7–1.5 |
| wood chips | 5.0–7.0 |
| kraft paper fiber | 0.8–1.2 |
| resin emulsion (solids) | 8.0–12.0 |
| dispersant | trace |
| accelerator | trace | said cast mixture having a density of from about 50 to about 75 lbs./cu. ft., and the wood and cast strips being adhesively bonded together and the composite banding elements being positioned at the edges of the core and being secured to the core with the cast strip presented toward the edge of the core.

10. A method for making an edge-banded fire door comprising molding a door core from a mixture of particulate materials including at least 50 weight percent of expanded perlite, at least 10 weight percent of calcined gypsum and an aqueous binder, compressing said mixture to form a molded door core; preparing an aqueous slurry of ingredients comprising at least 60 weight percent of gypsum dihydrate, fibers an an aqueous emulsion of a resin binder; forming a sheet by casting and drying said aqueous slurry; cutting strips from said sheet; preassembling edge banding elements from said cut strips and wood strips, the preassembled cut composition and wood strips being adhesively bonded to each other; and applying the preassembled edge banding elements to the edges of the core with the composition strip presented inwardly toward the edge of the core.

11. An edge-banded fire door comprising a gypsum composition core and banding elements each formed of preassembled strips of wood and of a gypsum composition, the composition strip comprising a mixture of from about 60 to about 80 weight percent of set gypsum, from about 5 to about 15 weight percent of reinforcing fibers, and an organic binder, and having a density of at least 50 lbs./cu. ft., the wood and composition strips of each element being adhesively interbonded in preassembled relation with end surfaces at each end lying in a common plane and each preassembled banding element being positioned at an edge of the core and being secured to the core with the composition strip of each element presented inwardly toward the edge of the core.

12. Fire door edge banding comprising a strip of wood and a strip of a cast mixture of the following composition:

| set gypsum | 67.3–78.0 |
| clay | 3.0–5.5 |
| raw vermiculite | 4.5–5.5 |
| glass fiber | 0.7–1.5 |
| wood chips | 5.0–7.0 |
| kraft paper fiber | 0.8–1.2 |
| resin binder | 8.0–12.0 | the cast strip having a density of at least 50 lbs./cu. ft., the wood and molded strips being adhesively bonded to each other.

* * * * *